Dec. 19, 1950 R. G. CLAPP 2,534,854

VARIABLE INDUCTANCE DEVICE

Filed Feb. 8, 1949

INVENTOR.
RICHARD G. CLAPP
BY
Brown, Denk & Synnestvedt
AGENTS

Patented Dec. 19, 1950

2,534,854

UNITED STATES PATENT OFFICE 2,534,854

VARIABLE INDUCTANCE DEVICE

Richard G. Clapp, Haverford, Pa., assignor to Philco Corporation, Philadelphia, Pa., a corporation of Pennsylvania Application February 8, 1949, Serial No. 75,255

1 Claim. (Cl. 171—242)

Figure 1:
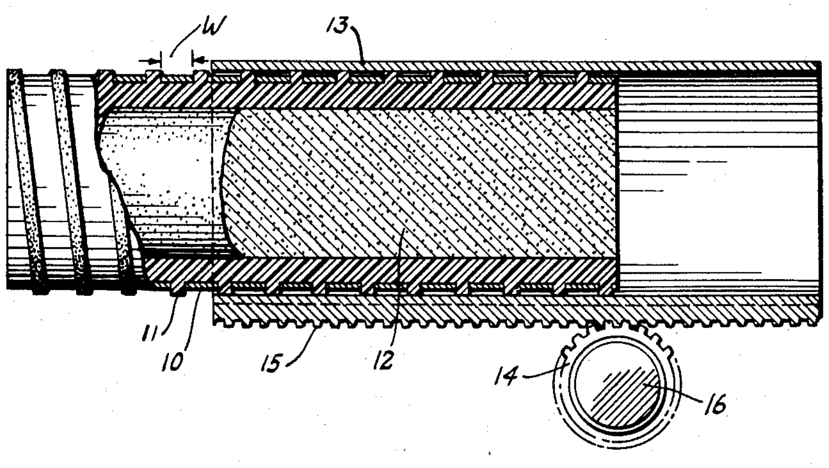

The present invention is broadly concerned with variable inductance devices and, more particularly, with tuning devices whose self-inductance is variable in a continuous manner.

When it is necessary to tune a resonant circuit, a transformer, or the like, it is often desirable to accomplish such tuning by varying the value of inductance of the inductive element in the circuit until the desired response is obtained from the circuit.

At first this change of inductance was accomplished by providing taps along the turns of an inductor and switching one or both of the leads from one tap to another, thus obtaining a different value of inductance each time. It soon became apparent that, since the switching process varied the inductance in discrete steps, this method did not, by itself, provide sufficient accuracy of adjustment. A sliding contact was next provided, which could be moved over the whole range of the inductor, thus giving continuous adjustment. This had the drawback that bulky physical arrangements were often required to give the necessary shielding for the inductor, while still permitting the contact to move freely. In addition, this construction did not permit, ordinarily, a fine enough adjustment, since the adjustment could only be practically made in steps of one whole turn at a time. Finally this method did not provide a sufficiently wide range of inductance.

Lastly, so-called permeability tuners came into use. Such tuners consist of an iron core inductor, the iron core of which is capable of varying degrees of axial insertion into the coil, thus varying the permeability of the medium surrounded by the coil and, thereby, the inductance of the coil. While these tuners permitted satisfactory continuous adjustment of inductance, they were incapable of adjustment over a range of inductance sufficiently wide to accommodate the needs of present-day television and frequency-modulation transmission and reception, unless they were made large and bulky and thereby prohibitively costly and difficult to produce and install.

My invention overcomes the defects hereinbefore described and provides a novel and improved variable inductor.

An inductor constructed in accordance with my invention is characterized by a minimum inductance value which is considerably lower than that of otherwise comparable inductors which may have been constructed heretofore. Since its maximum inductance value remains unaffected by this lowering of its minimum inductance value, my novel construction results in the provision of an inductance range of proportions previously unattainable by simple means.

It is, thus, an object of the present invention to provide a novel variable inductor capable of being varied over a relatively wide range of inductance.

It is another object of the present invention to provide a novel variable inductor having a wide range of inductance and capable of being adjusted with precision to any value of inductance within its range.

It is a further object of the present invention to provide a novel variable inductor of wide range and high precision which is, in addition, of simple and rugged construction.

Still another object of the present invention lies in providing an inductor which has a wide range of values of inductance relative to its physical size and weight.

Figure 2:
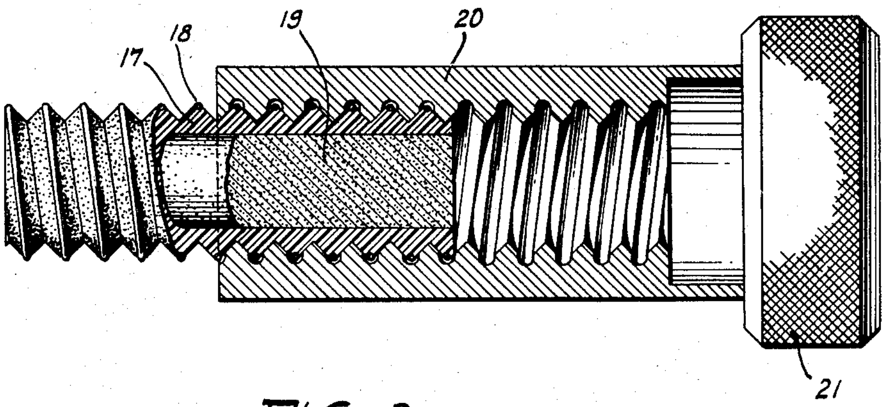

These and other objects of the present invention will become apparent from the following more detailed discussion when considered in connection with the accompanying drawings, wherein:

Figure 1 is a view partly in section, of a variable inductor illustrating an embodiment of the present invention; and Figure 2 is a view, also partly in section, of a variable inductor showing an alternative embodiment of the present invention.

Referring now in more detail to Figure 1, there is shown a variable inductor, comprising a flat copper strip 10 wound into a coil on a spirally grooved coil form 11, the hollow portion of the coil form being filled with any suitable magnetic core material 12 such as, for example, powdered iron. Surrounding the coil 10, and in axial alignment therewith, is a non-magnetic metal sleeve 13, so constructed as to be in as close proximity to coil 10 as is practicable without touching coil 10.

Particular attention is called to the fact that, in a variable inductor constructed in accordance with my invention, the sleeve hereinbefore described surrounds the coil, that being the relative position of sleeve and coil in which the separation between them can be held to a minimum. The importance of minimizing this separation lies in the decrease in the inductance of a coil thus surrounded, a phenomenon which, in turn, extends the range of inductance over which my novel inductor is variable. In fact, by surrounding the coil sufficiently closely with its sleeve, the individual turns of the coil may be decoupled from each other and from the core to such an extent as to exhibit an inductance scarcely higher than that of an equivalent length of straight wire.

The preferred embodiment shows the sleeve 13 resting on the ridges separating the spiral grooves in coil form 11, which grooves are made sufficiently deep to prevent contact between the coil and the sleeve, while simultaneously maintaining coil 10 and sleeve 13 in their proper axial alignment. Means are provided for varying the extent of coil 10 which is to be surrounded by sleeve 13 such as, for example, pinion 14 engaging rack 15 and arranged to be rotated in either direction by means of knob 16, thus positioning sleeve 13 so as to envelop varying portions of coil 10.

In this arrangement, the presence of the iron core raises the maximum inductance value of the inductor to the desired value, while the sleeve, which may be thought of as shielding varying axial portions of the coil, decreases the minimum inductance value considerably below what might be obtained by merely removing the iron core, as is done, for example, in the aforementioned, prior art permeability tuners.

The minimum value of inductance is obtained with this arrangement when sleeve 13 envelops the entire length of coil 10, while the maximum value of inductance is obtained when sleeve 13 is entirely removed from coil 10. Both of these conditions are evidently easily obtainable by using the arrangement of Figure 1. Furthermore any intermediate value of inductance may be obtained by placing the sleeve in the proper intermediate position along the coil.

Of course, it will be understood that it is not an essential feature of the invention that the position of the coil be fixed while that of the sleeve be adjustable. The reverse arrangement may equally well be used, as well as an arrangement wherein, generally speaking, the relative positions of the coil, including its core, and of the sleeve may be varied.

Several factors govern the proper design of a variable inductor in accordance with the present invention.

Since the sleeve 13 of Figure 1 is used to shield varying portions of coil 10, thereby decreasing the inductance of coil 10 from the value it would have in the absence of sleeve 13, this sleeve 13 should be placed as close to coil 10 as is practicable and the separation between coil and sleeve, should, in general, be considerably smaller than the separation between coil and iron core. The minimum inductance will then be substantially unaffected by the presence of the iron core. However, the iron core should fill up as much as possible of the space inside the coil to keep the maximum value of inductance as high as possible. This can be accomplished, in the preferred embodiment shown in Figure 1 by making the dimensions of the coil form such as to separate the coil from the core by a space much wider than that which separates the coil from the sleeve. Experiment has shown that, for best results, the coil form should provide a spacing of the coil from the core which is approximately six times as wide as the spacing of the coil from the sleeve. Under these circumstances, the iron core can be permitted to fill the entire inner space of the coil form substantially without affecting the minimum value of inductance of the inductor.

If the spacing between coil and sleeve is held to the minimum practicable value, then a six times wider spacing between coil and core will still yield a sufficiently high maximum value of inductance when the sleeve is removed as required by the features of the present invention.

Also in order to obtain a sufficiently small minimum value of inductance, care must be taken to keep the pitch of the turns in coil 10 large compared to the spacing between the coil and sleeve 13. Experimental investigation shows that if the spacing between consecutive turns of coil 10 is made at least three times as wide as the spacing between coil 10 and sleeve 13, the coil inductance in the minimum inductance condition is increased by less than five per cent by the mutual inductance between turns of the coil. This is clearly a desirable condition since it serves to further minimize the minimum inductance.

By considering the coil and sleeve, when in the minimum inductance position, as a transmission line, one side of which is the conductor and the other side of which is the sleeve, it can be shown that, theoretically, the minimum value of inductance can be decreased indefinitely by simply increasing the width W of the flat conductor of Figure 1, but actually, practical considerations of tuning capacity and circuit impedance will determine the lowest usable value of minimum inductance and thereby the maximum width W.

If it is further desired to obtain a maximum value for the ratio of maximum inductance to minimum inductance of an inductor constructed in accordance with the present invention, it can be shown that this ratio increases as the dielectric constant of the medium separating the coil from the sleeve decreases. Thus, the range of inductance obtainable with an inductor constructed in accordance with the present invention will be greatest if air is used to separate the coil from the sleeve, other factors being held constant.

Since variable inductors find widely differing applications, it will be necessary, in each case, to design the inductor to give the performance desired for a particular application. For example, inductors constructed in accordance with the present invention may be designed to yield a particular minimum value of inductance, or a particular figure of merit, or again a particular ratio of maximum to minimum inductance.

While individual parameters may vary for each application the inductors will all be constructed in accordance with the principles of the present invention as hereinbefore set forth.

It will be understood that the cross-sectional shape of the conductor illustrated in Figure 1 does not constitute one of the essential features of the present invention. This conductor may, for certain applications, be of some other suitable cross-sectional shape, such as of circular cross-section.

With more detailed reference now to Figure 2, there is shown a variable inductor constituting an alternative embodiment of the present invention. The inductor comprises a spirally grooved coil form 17, with a circular channel extending continuously along the ridge separating adjacent grooves. A coil of round wire 18 is wound on the form 17 so as to rest in the aforementioned channel. The hollow space inside form 17 is occupied by a suitable magnetic core 19, and a spirally grooved non-magnetic metal sleeve 20 is so arranged as to engage with the spiral grooves of form 17. Knob 21 is rigidly attached to sleeve 20. Twisting of knob 21 will then result in sleeve 20 enveloping a larger or smaller portion of coil 18 depending upon the direction in which knob 21 is twisted. This, in turn, will bring about a change in the value of the inductance of coil 18 in a manner similar to that described in connection with Figure 1.

While the structure and operation of this embodiment is essentially similar to that of Figure 1, the embodiment shown in Figure 2 is superior to that in Figure 1 in that it provides a metal path consisting of the ridges separating adjacent grooves in sleeve 20, thus improving the shielding between turns of coil 18. This shielding decreases the mutual inductance between turns and thereby lowers the minimum value of inductance obtainable with a variable inductor constructed in accordance with the present invention.

While the selection of the materials of which the various components of a variable inductor are to be constructed in accordance with the principles of the present invention is important in obtaining the performance required for a particular application, it can readily be seen that such selection of materials does not constitute an essential feature of the present invention.

Although the present invention has been described with particular reference to certain specific embodiments, it will be understood that the invention is capable of still other forms of physical expression, and consequently is not limited to the specific disclosure but only by the scope of the appended claim.

I claim:

A variable inductance device comprising: a ferromagnetic core having an axis; an externally-threaded cylindrical dielectric coil form closely surrounding said core parallel to said axis, said coil form being provided with a spiral groove extending continuously along the ridge separating adjacent threads; a conductor wound upon said form and resting within said groove; and an internally-threaded non-magnetic conductive sleeve arranged and disposed in engagement with the threads of said form, the minimum depth of said sleeve threads, measured radially from said axis, being substantially greater than the combined depth of thread of said form and maximum dimension of said conductor measured radially from said axis, and the width of said sleeve threads, measured in a direction parallel to said axis, being substantially greater, at any radial distance from said axis, than the conductor dimension also measured parallel to said axis at the same radial distance therefrom.

RICHARD G. CLAPP.

REFERENCES CITED

The following references are of record in the file of this patent:

UNITED STATES PATENTS

| Number | Name | Date |
|---|---|---|
| 542,471 | Golden | July 9, 1895 |
| 1,904,208 | Dow | Apr. 18, 1933 |

FOREIGN PATENTS

| Number | Country | Date |
|---|---|---|
| 454,847 | Germany | Jan. 19, 1928 |